May 1, 1928.
J. DAIN
1,667,843
MOTOR PROPELLED CULTIVATOR
Filed June 6, 1916    3 Sheets-Sheet 1
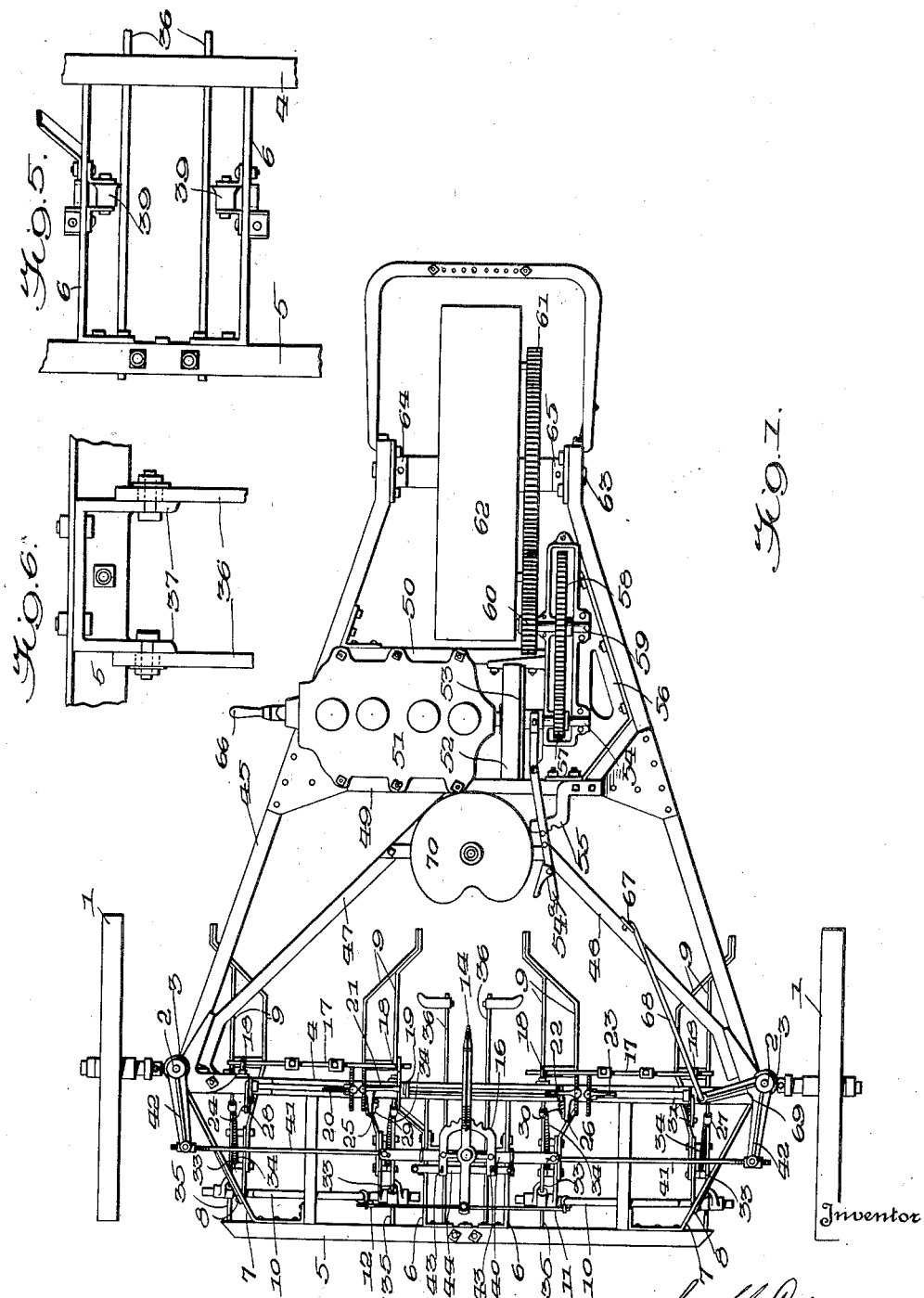

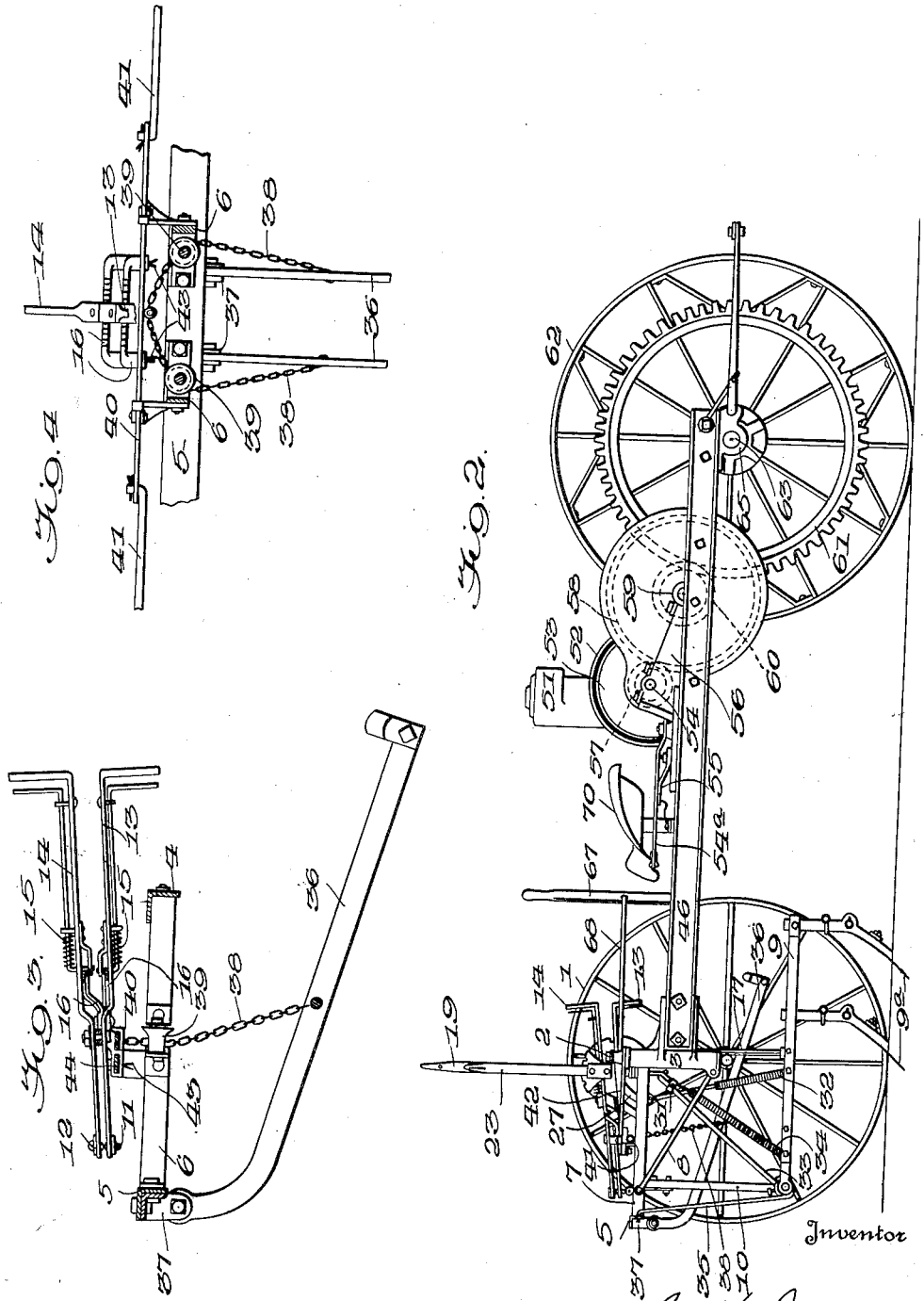

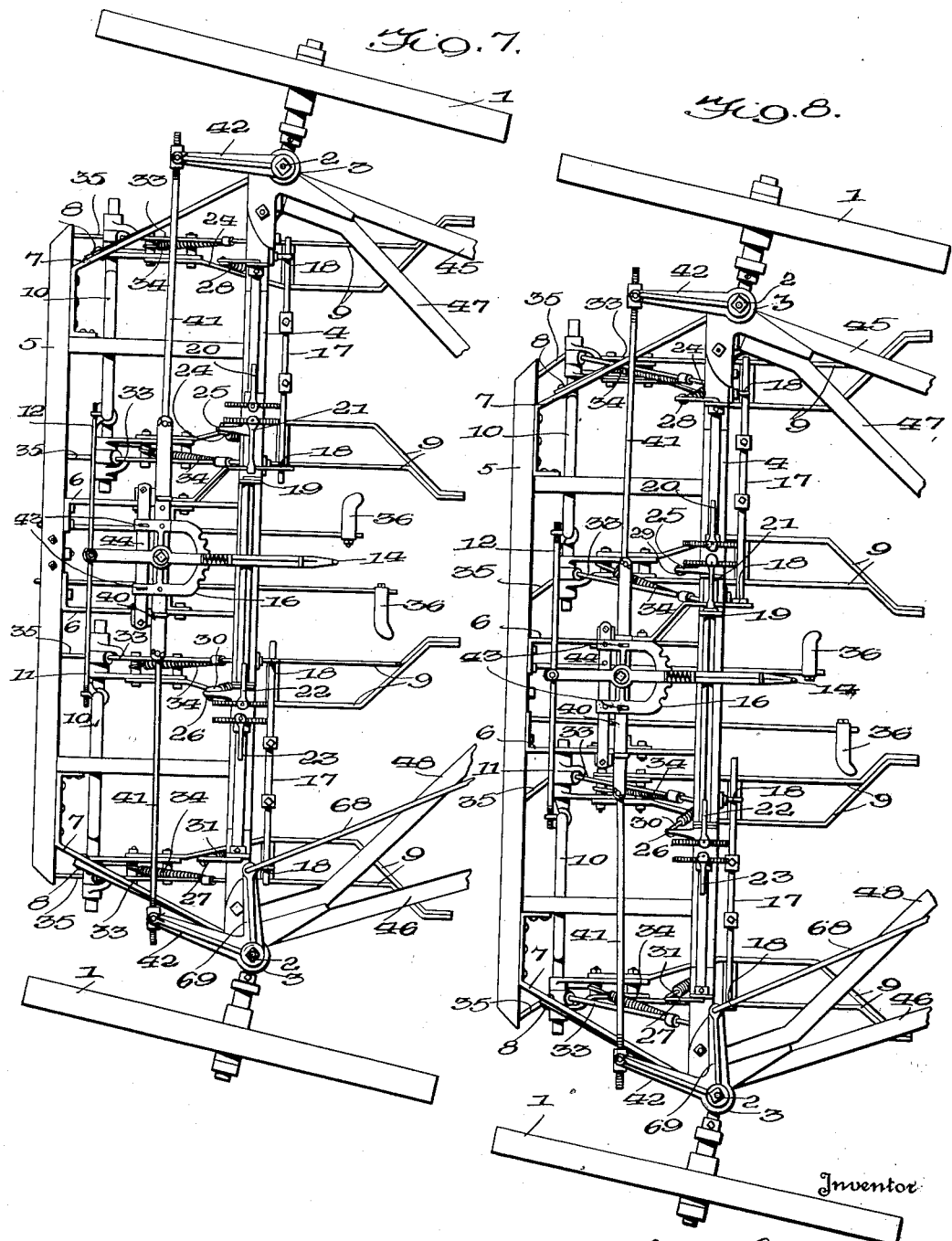

Patented May 1, 1928.

1,667,843

UNITED STATES PATENT OFFICE.

JOSEPH DAIN, OF MOLINE, ILLINOIS, ASSIGNOR TO DEERE AND COMPANY, OF MOLINE, ILLINOIS, A CORPORATION OF ILLINOIS.

MOTOR-PROPELLED CULTIVATOR.

Application filed June 6, 1916. Serial No. 102,049.

This invention relates to improvements in earth-working or tillage implements of the cultivator class. The object is to provide a construction and arrangement of parts such that the implement can be propelled by an engine or a motor, and the implement and the tools can be readily guided and controlled in their movements with an accuracy that has not been attainable with any of the earlier power propelled implements within my knowledge.

The features of improvement will be understood from the illustrations and the following description:

Fig. 1 is a plan view of a cultivating implement embodying my improvements;

Fig. 2 is a side elevation;

Fig. 3 is a detailed view, partly in section, showing the means by which the guiding devices and the tools can be controlled;

Fig. 4 is a rear elevation, partly in section, of the parts shown in Figure 3;

Figs. 5 and 6 show details.

Figure 7 is a plan view showing some of the parts for the purpose of illustrating the relative positions of the steering wheels, framework, and the gangs when the optional connections are such as to require an action for steering the wheels separate from the actions for adjusting the gangs bodily laterally.

Figure 8 is a partial plan view showing enough parts to illustrate the relative positions of the parts at the time when the optional connections have been made whereby the gangs can be adjusted simultaneously by the same guiding movement which also steers or adjusts the wheels.

In the drawings I have shown all the parts, in detail, of a mechanism which, as aforesaid, embodies my improvements. But it will be understood that there can be numerous modifications without departing from the essential features of the invention.

In the drawings 1, 1, indicate the steering wheels. They are mounted on spindles with stems 2, 2, in sockets 3 secured to the transverse member 4 of the frame. The frame comprises also an element projecting forward from the transverse vertical planes of the steering wheels, composed of the transverse bar 5, braces 6, 6, and braces 7. There are also additional braces at 8 extending from those at 7 to the lower parts of the sockets 3. 9—9—9—9 are the drag bars or frame parts of the tool gangs or rigs, and are pivotally connected to the gang carriers or arches 10, 10. The tools 9ᵃ that are carried by the drag frames 9 are so positioned as to engage the earth on lines in the transverse vertical planes of the wheels, for reasons to be described. The carriers or arches 10, and the tool gangs carried thereby, can be bodily shifted, laterally. The arched bars 10 are supported on the undersides of the frame bars 6 on which they can slide transversely. They are shifted or adjusted by links 11 and 12, the former connected with a lever 13, and the latter with a lever 14. Each lever has a notched rack 16 and a hand latch and dog at 15.

The tool gangs of each pair are tied together, to hold the rear ends in proper relation, by a supplemental arch 17 which is supported in brackets 18, 18 on the cross member of the frame, this arch having sliding and swinging movements in the brackets to permit easy lateraly adjustments of the tool gangs and also to permit them to be raised or lowered.

19 is a master lever for raising all the gangs of both pairs simultaneously. There are also levers 20, 21, 22 and 23 for raising, lowering and adjusting any gang independently of the others. Each of these levers 20, 21, 22 and 23 actuates a rock arm on the frame member 4, these rock arms, respectively, having cranks 24, 25, 26, 27, and the crank arms being connected with the gangs, respectively, by rods 28, 29, 30 and 31. 32, 32 indicate compression springs, one of which is mounted on each of the last said rods, and bears downwardly thereon, but is adapted to permit its gang to move vertically independently of the others, as frequently becomes necessary because of the tools engaging with obstructions. At 33, 33 there are braces, each of which extends from the lower part of the arch 10, upward and rearward, and its, at its upper end, fastened to the frame by pivoting devices which permit the arches to be laterally moved. Each tool gang has an expansion spring 34 which is adjustably attached to one of the said braces 33, these springs assisting in lifting the gangs when moved by one of the controlling levers. The arches 10 are further braced in relation to the front frame member 5 by the pivoted braces 35, 35. 42, 42 are arms secured to the wheel spindles 2, each connected by a link 41 to a slide bar 40. 38, 38 are two chains connected to the slide bar and running over anti-friction rollers 39. 36, 36 are foot levers connected to the ends of the chains 38 and pivoted in brackets 37 on the front frame bar 5. The two chains 38 may be regarded as a single chain attached, at its central link, to the slide bar.

When the operator presses upon one of the foot levers, it causes its chain to move the bar 40 longitudinally, transversely of the machine, and this, through the links 41 and arms 42, turns the wheel spindle and swings the steering wheels, as desired. The two foot levers work in opposition to each other in respect to the throwing of the wheels.

The steering wheels and the tool gangs can be adjusted or shifted simultaneously. To permit this, the operator removes the cotters 43 which secure the rack 16 to its support 44, and places them in suitable apertures in the lever rack and in bar 40, and thereupon the steering wheels will be turned when the bar 40 is shifted by the foot levers and will carry the levers, the arches, and the gangs, laterally. This is illustrated in Fig. 8 where the cotter pins 43 are shown as removed from the frame bar 44 and inserted through the rack bar and through the transversely moving bar 40. Fig. 7 illustrates the relative positions of the parts when the cotter keys connect the brake bar to the frame bar, permitting the slide bar 40 to move longitudinally independently of the rack bar, at times when the turning of the wheels is to be effected without shifting the tool gang.

The operator can steer or guide the machine with his hand instead of his feet, or can, with his hand, assist his feet by using a hand lever 67 which is connected by a link 68 to an arm 69 (preferably integral with one of the arms 42), and is rigidly attached to the stem part 2 of one of the spindles.

Heretofore, cultivators having their tools, together with the tool-supporting and adjusting mechanism, arranged in relation to the steering wheels in the way above described, have had the propelling power applied to them from the front. They have been drawn either by horses or by tractors flexibly connected to them.

Serious disadvantages and difficulties were experienced when such machines were being operated.

The principal desideratum is that the operator should be able to direct his sight and attention to the plants and to the lines along which they are growing, and that there should be an avoidance of all occasion for him to remove his sight from the plants, as, for instance, the raising of his eyes to give regard to the positions of the team or of the tractor.

Another matter found necessary for perfect steering and controlling of the implement relatively to the plants is that there should not be in front of the tools and of the steering wheels any draft agency engaging with the ground and only slowly movable toward one side or the other.

I have avoided these difficulties by combining with the apparatus above described a power means which engages with the ground at points behind the tools and the steering wheels, and propels them by a pushing action, this permitting me to dispense with all ground-engaging objects, connected with the tool frame, at points in front of the tools, and opens the way for having the tools brought quickly and accurately to any desired working point, and for making the movements of the different parts of the apparatus immediately responsive to the changes in positions of the tools.

In the drawings the devices illustrated for this purpose are constructed and arranged as follows:

45, 46 are frame bars secured to the opposite end portions of the transverse member 4 above described, which bars serve as thrust bars to transmit the propelling force to the parts at the front of the cultivator. They extend backward a suitable distance, and are shown as converging rearward. Supplemental frame bars 47, 48 are provided, these being also rigidly connected to the end portions of the transverse member 4 and converging toward the center. At 49, 50 there are cross frame elements rigidly secured to the longitudinally arranged bars 45, 46, 47 and 48.

This frame, at its rear end, rests upon a traction wheel 62 which is mounted on the axle 63, supported in bearings 64, 65.

51 is a motor, here an explosive engine, mounted on the frame just described, and preferably in transverse planes in front of those of the traction wheel 62. The engine has a balance wheel 52, carrying one element of a clutch, there being a companion element 53 on shaft 54, with a shifting lever 54ª for the element 53, and a lock rack 55. 56 is a supporting frame with bearings for shaft 54, the latter carrying pinion 57 which meshes with gear 58 on a countershaft 59 mounted on the frame. 60 is a pinion on shaft 59 meshing with the bull gear 61, rigidly attached to the traction wheel 62.

The operator's seat is indicated at 70. It is mounted on the power frame, (preferably on transverse lines between those of the engine and of the traction wheel) at the rear, and those of the tools and steering wheels at the front. It is so positioned that, when the operator is seated therein, he can quickly reach and manipulate any of the levers above specified, namely, the foot levers 36, the hand lever 14, the lever 67, the lifting levers 19, 20, 21, 22, 23, and also the clutch lever 54.

The operation of the implement will be readily understood. The engine is started by the crank and handle at 66 on the end of the crank shaft; the clutch at 52, 53 is closed, and the implement is brought into proper position relatively to the rows of plants to be cultivated. The implement shown in the drawings is capable of cultivating two rows of plants simultaneously, the line of the plants of one row being between the two right-hand tool gangs, and the line of the other row lying between the two left-hand gangs. The operator and the traction wheel are on longitudinal lines between the two rows under cultivation. The traction of the drive wheels 62 results in pushing the tool frame and steering wheels forward. The field at all points in front of the tool frame is open to view.

If the lines of the plant rows are straight and parallel, it is merely necessary to secure a proper initial adjustment of the steering wheels and positioning of the gangs, the lines of advance being easily maintained by the operator through the agency of his foot levers and the hand lever 67. But, during the greater part of the time, agencies are met with which demand that the tools should be thrown laterally in one direction or the other. The rows of the plants are not perfectly aligned and not parallel. These facts make it necessary to bring the tools to and from the positions actually occupied by the plants. With the earlier mechanisms of which I have knowledge, the parts are so related that an appreciably long period of time is necessary to throw a tool from one position, laterally, to another, and the speed of advance is such that the tools cannot be thrown in and out sufficiently quickly to attain thorough cultivation and avoid the marring of the plants.

With the present implement, the steering wheels are near the front end of the frame, and the tools engage with the earth on lines in the transverse vertical planes of the steering wheels. The implement is, as above described, not pulled, but pushed, by traction devices in the rear. And these traction devices are so arranged as to permit the quick turning of the front end. Consequently, immediately after the operator starts to vary the lines of the steering wheels, the tools respond with a quick lateral movement. And, moreover, when the tool carriers are connected to the steering wheel supports, the optional shifting of the tools is instantly answered by a corresponding shifting of the steering wheels. The result of all these matters is that the operator can keep his eye and his attention directed upon the positions of the plants immediately in front of him, and, by his levers, can bring the tools to, or hold them at, any desired position, without being required to raise his line of sight to give attention to other matters, as is the case when a pulling draft is exerted by horses or by a tractor in front of the cultivator. And the traction mechanism, being in the rear, automatically follows the paths prescribed by the steering wheels and the tools, without requiring the operator to pay any attention thereto.

I am aware of the fact that implements of this general class have been heretofore proposed, each having a frame with steering wheels at the front and traction wheels at the rear, together with tools arranged to engage with the earth on lines in transverse planes other than the planes of the steering wheels.

I am further aware that earth-working apparatus, such as plowing mechanisms, have been proposed, each of which comprised a triangular frame with steering wheels at one end and a traction mechanism at the other, and a series of plow bodies arranged along the line extending from the front to the rear of the frame.

But from what has been above described, the advantages incident to the present implement, where the tool gangs are arranged relatively to the steering wheels at the front end of the frame in the manner set forth, will be apparent upon comparison with the said earlier mechanisms.

What I claim is:

1. In a cultivator, the combination with a rigid frame comprising a forward transverse member and thrust bars connected with opposite end portions thereof and converging rearwardly therefrom, of a front transverse bar in advance of and connected with said transverse member, soil tilling rigs connected with said front transverse bar, dirigible wheels supported at the end portions of said transverse member, traction means supporting the rear portion of said frame, a motor mounted on the rear portion of said frame, driving connections between said motor and said traction means, a driver's seat supported by said thrust bars back of the rigs and forward of the motor and traction means, and in the median line of the cultivator, means operable from said seat to steer said dirigible wheels, and means operable from said seat to control said driving connections.

2. In a cultivator, the combination with a rigid frame, comprising a forward transverse member, thrust bars connected with opposite end portions thereof and converging rearwardly therefrom, a front transverse bar in advance of and connected with said forward transverse member, and seat supporting means, of dirigible wheels supported at the end portions of said forward transverse member, traction means supporting the rear portions of said thrust bars, a motor supported by said thrust bars, driving connections between said motor and said traction means, cultivator rigs connected with said front transverse bar, cultivating tools carried by said rigs and engaging the soil forward of said motor, a driver's seat mounted on said seat-supporting means in the median line of the cultivator at a point forward of said motor and back of said tools, the space between said seat and the forward transverse member being free from frame parts, to afford the driver an unobstructed view of the operation of the tools, means operable from said seat for steering said dirigible wheels, and means operable from said seat for controlling the operation of said driving connections.

3. In a cultivator, the combination with a rigid frame, comprising a forward transverse member, thrust bars connected with opposite end portions thereof and converging rearwardly therefrom, a front transverse bar in advance of and connected with said forward transverse member, a transverse frame member secured intermediately to said thrust bars, and rearwardly converging supplemental frame bars having their forward end portions connected with opposite end portions of said forward transverse member and their rear end portions connected with the central portion of said transverse frame member, of dirigible wheels mounted at the end portions of said front transverse member, a traction wheel supporting axle supported by the rear end portions of said thrust bars, a traction wheel disposed in the median line of the cultivator and mounted on said axle, a motor supported by said transverse frame member, driving connections between said motor and said traction wheel, a driver's seat mounted on the rear portions of said supplemental frame bars in advance of said motor, and in the median line of the cultivator, soil tilling rigs connected with said front transverse bar, tools carried by said rigs and engaging the soil in advance of said seat, means operable from said seat for steering said dirigible wheels, and means operable from said seat for operating said driving connections.

In testimony whereof I affix my signature.

JOSEPH DAIN.